United States Patent [19]

Lin et al.

[11] Patent Number: 5,553,171
[45] Date of Patent: Sep. 3, 1996

[54] APPARATUS AND METHOD FOR ARBITRARY BINARY RESOLUTION CONVERSION

[75] Inventors: Ying-wei Lin, Penfield; Jeng-Nan Shiau, Webster, both of N.Y.

[73] Assignee: Xerox Corporation, Stamford, Conn.

[21] Appl. No.: 507,064

[22] Filed: Jul. 26, 1995

Related U.S. Application Data

[63] Continuation of Ser. No. 143,734, Nov. 1, 1993, abandoned.

[51] Int. Cl.⁶ ................................................. G06K 9/36
[52] U.S. Cl. ............................................ 382/299; 358/445
[58] Field of Search .................................. 382/302, 298, 382/299, 276; 395/102, 109; 358/445, 451, 455, 459

[56] References Cited

U.S. PATENT DOCUMENTS

| | | | |
|---|---|---|---|
| 4,194,221 | 3/1988 | Stoffel | 358/283 |
| 4,829,587 | 5/1989 | Glazer et al. | 382/47 |
| 5,185,852 | 2/1993 | Mayer | 395/109 |
| 5,208,871 | 5/1993 | Eschbach | 382/41 |
| 5,270,836 | 12/1993 | Kang | 382/47 |
| 5,301,037 | 4/1994 | Kang et al. | 358/451 |
| 5,355,233 | 10/1994 | Okamoto | 358/455 |
| 5,363,213 | 11/1994 | Coward et al. | 358/455 |

OTHER PUBLICATIONS

Stremler, Ferrel G. "Introduction to Communication Systems" pp. 124–125, 1982.

European Patent Application; Publication No. 0 206 401; "Method of Enlarging/Reducing a Dithered Image"; Nov. 6, 1986.

European Patent Application; Publication No. 0 220 568; "Method of and Apparatus for Generating High–Resolution Bilevel Image Data", Jun. 5, 1987.

*Primary Examiner*—Michael L. Razaw
*Assistant Examiner*—Larry J. Prikockis
*Attorney, Agent, or Firm*—Michael J. Nickerson

[57] ABSTRACT

A method of arbitrary image resolution conversion takes an original print ready image at a first resolution and orientation and simulates printing of that image by creating a representation of a page at a particular resolution and orientation using a suitable spot model for the reconstruction function. The image is then filtered with a low pass filter and sampled with an aperture that corresponds to the desired output. The image data, which may be definable at several bits per pixel, is then made print-ready by reducing the number of bits defining each pixel to a valid output state. The reduction step is accomplished through error diffusion methods that maintain the local area gray density level. The filtering step reduces moire in the converted image.

14 Claims, 11 Drawing Sheets

APPARATUS AND METHOD FOR ARBITRARY BINARY RESOLUTION CONVERSION

This is a continuation of application Ser. No. 08/143,734, filed Nov. 1, 1993, now abandoned.

FIELD OF THE PRESENT INVENTION

The present invention is directed to arbitrary resolution conversion of binary images. More specifically, the present invention is directed to arbitrary resolution conversion of binary images using a suitable spot model and bandlimiting low pass digital filter to reduce moire in halftones.

BACKGROUND OF THE PRESENT INVENTION

Image information, be it color or black and white, is commonly generated in a bitmap format at a particular scale, orientation $\Theta$ and resolution K×L×b, corresponding to a desired printer output, where K is a number of spots per unit of length in one dimension, L is a number of spots per unit length in the other dimension, and b is the depth of each pixel, in number of levels. This bitmap is present for every color separation of the output device; i.e., 4 bitmaps for a 4-color output device, 3 for a 3-color, 2 for a 2-color and 1 for a black and white output device. In a common example of a black and white output, image data comprising a bitmap to be printed is provided to a printer suitable for printing at 300 spots per inch (spi) in both dimensions, at a one bit depth giving 2 levels. Many considerations drive this single selection of resolution, including the desirability of providing only a limited number of fonts (alphanumeric bitmaps) so as to use only a limited amount of storage space. Common software packages available on personal computers or for operation of input scanners for document creation also usually provide only a single resolution output. Images are commonly arranged at a fixed orientation Increasingly, the resolution available from printers varies over a wider range of choices. Printer resolutions are available over a range, for example, from less than 200 spi to more than 600 spi. Resolutions vary for a number of reasons, generally related to the quality of the output image. Simply printing a 300 spi bitmap at 400 spi or 600 spi is undesirable however, since the image will be reduced substantially in size on the output page or display. It would be highly desirable to provide the capability of printing any image at any resolution, while maintaining or selecting the output size and orientation.

It is a common practice to implement conversion of a bitmap of first resolution K×L×b to a bitmap of second resolution M×N×d through simple pixel level and raster level operations, such as pixel doubling. Pixel doubling is, at the binary level (where printing is commonly done, with binary printers), only applicable where M and N are integer multiples of K and L, respectively.

A primary problem of the art is that the density in any given area of coverage is not maintained with pixel doubling or similar methods Thus, image artifacts which give the image a different appearance are noted in the resolution converted and/or rotated image.

Algorithms that convert gray images to binary or other number of level images attempting to preserve the local density exist in applications separate from conversion. These and similar methods might be applied as one part of the method in conversion. One algorithm, which can be used to prepare an image at a given resolution and level depth of K×L×c for printing on a printer with resolution K×L×d, where d<c, is error diffusion as described in U.S. Pat. No. 5,208,871 to Reiner Eschbach. The entire contents of U.S. Pat. No. 5,208,871 are hereby incorporated by reference.

U.S. Pat. No. 5,208,871 discloses a method of image conversion using error diffusion techniques. This method emulates the operation of a printer/scanner/printer combination to convert an K×L×b at $\Theta$ bitmap to an M×N×c at $\Phi$ bitmap, and subsequently to an M×N×d at $\Phi$ bitmap for printing. K, L, M and N are resolutions in spots per inch and b, c and d are the number of levels per pixel at which the pixel information is encoded, and $\Theta$ and $\Phi$ designate the orientation of the fast scan axes of both systems. This is illustrated in FIGS. 1–5 of the present application.

FIG. 1 shows a conventional block diagram for performing the image conversions method described hereinafter to convert a K×L×b at $\Theta$ bitmap to a M×N×d at $\Phi$ bitmap. The scaling of the input bitmap is done by emulating or mimicking a printing and scanning process with an electronic device. FIG. 1 illustrates an image conversion method 10 that emulates a useful physical method of image conversion. Using the following described operations, a printer 12 would print an image that is ready for printing or display at a resolution of K×L×b at orientation $\Theta$. "K" and "L", the resolutions in spots per unit length along the corresponding directions, hereinafter "spots per inch" (spi), can range from 72 spi to 1200 spi, with greater or lesser values not excluded and $\Theta$ is the angle or axis along which the image is oriented. Angles $\Theta$ and $\Phi$ are measured in relation to this arbitrary axis and the actual rotation performed is given by the difference $\Theta-\Phi$. Printers usually have equal resolutions in two dimensions, i.e.: K=L and M=N, but this is not a requirement.

The symbol "b" represents the number of levels at which each pixel may appear. The most common printers (binary printers) have two levels, in which the first level is represented by a white spot, and the second level is represented by a black spot. Some printers use 4 levels, where levels 0 and 3 are represented respectively by white and black spots, and levels 1 and 2 are represented by intermediate gray levels. This digital description is used to software simulate a "printed image" at the necessary spatial and level resolution, where either or both the resolutions to describe this virtual page may be different from the original representation K×L×b at $\Theta$. The "printed image" is then scanned by a scanner 14, which is selected to have a resolution M×N at $\Phi$ (where M and N are resolutions in spi and $\Phi$ is the angle or axis along which the image is oriented, not necessarily parallel to $\Theta$) related to the ultimate desired output. Scanners usually produce gray image data, where each pixel forming the image data has a value representing the amount of light detected from the image. This value is immediately converted to a gray level value, e.g.: between 0 and $2^n$, so that a scanned image is available as an output from the scanner at a M×N×c at $\Phi$. That image must be then converted to "d" levels at a print quantization device 16, where d is the number of levels that the ultimate printer is able to print. This can be done with an error diffusion algorithm. The output of print quantization device 16 is then an image in M×N×d at $\Phi$, ready to be printed by a printer capable of printing such an image. Depending on the resolution of the output device, the image now has a new resolution, scale and/or orientation.

The equipment described with respect to FIG. 1 operates in accordance with the method described in the flow chart of FIG. 2. At step S100, the method takes a print ready image for conversion. The input bitmap, defined by the function B(x,y) can be described by a series of delta (δ) peaks:

$$B(x,y) = \sum_{e,f=0}^{E,F} b_{e,f}\delta(x-x_e)\delta(y-y_f)$$

Where:
- $b_{e,f}$ is the value of the bitmap at pixel e,f;
- $(x_e, y_f)$ is the location of the discrete set of pixels (e,f);
- (x,y) is the spatial coordinate; and
- E, F are the number of pixels in the bitmap along the different axes.

Ideal printing is simulated at step S110 by attaching the pulses that would be generated by an ideal printer at each delta (δ) peak giving the "printed" output. The print-mark of the simulated output printer can be denoted by 'dot(x/$\Delta_{xi}$, y/$\Delta_{yi}$)', giving the print function P(x,y) as:

$$P(x,y) = \sum_{e,f=0}^{E,F} b_{e,f}\delta(x-x_e)\delta(y-y_f) \star dot(x/\Delta_{xi}, y/\Delta_{yi}),$$

Where ★ denotes the convolution operation.

Dot(x/$\Delta_{xi}$, y/$\Delta_{yi}$) describes the mark the printer would generate on paper with the dot's center located at (x,y)=(0,0) and resolution 1/$\Delta_{xi}$, 1/$\Delta_{yi}$, where the dot may be a real or ideal printer output.

P(x,y) thus describes the page as it would be generated by a printer having the same resolution as the input bitmap. For simplicity and speed, approximations can be made to P(x,y). At step S115, P(x,y) is optionally modified using adjustments of the tonal-reproduction-curve or other standard image processing techniques as filtering, giving a modified P'(x,y) described by the function F, in order to compensate for actual printer characteristics, including enhancement or compensation for adjacency effects of two adjacent spots running together:

$$P'(x,y)=F\{P(x,y)\}.$$

At step S120, P'(x,y) is "rescanned" with an aperture apert(v/$\Delta_{vo}$, w/$\Delta_{wo}$) that reflects the new resolution and orientation for the desired output and resampled at the new resolution and orientation, so that the output of the scanning function O(v,w) can be defined as:

$$O(v,w) = \sum_{g,h=0}^{G,H} \{[P'(x,y) \star apert(v/\Delta_{vo},w/\Delta_{wo})]\delta(v-v_g)\delta(w-w_h)\}$$

O($v_g$, $w_h$) is then optionally produced in step S125 by a function G, as given by $$O'(v_v,w_h)=G\{O(v_g,w_h)\}$$

where G can be used to adjust the tonal-reproduction-curve or enhance or filter the intermediate image, giving $$O'(v_v,w_h)=c'_{g,h}\cdot\delta(v-v_g)\delta(w-w_h)=G\{cg,h\cdot\delta(v-v_g)\delta(w-w_h)\}$$

The mapping function generated by convolving the two functions is shown in FIG. 3. It can be seen that pixels in portion 300 of function B(x) at a first resolution $\Delta_i$ partially overlap with pixels at a second resolution $\Delta_o$. Thus, pixels at the second resolution have both black and white area coverage within the pixel, that can be considered as gray, where the level of gray, which lies between black and white, is a percentage of the area that is black.

FIG. 4 illustrates the results of the conversion of the bitmap P(x,y), from K×L binary image at orientation Θ, to O(v,w) at orientation Φ, an M×N gray level image 320. The depth 'c' of each pixel is determined by the scaling and/or rotation used, the resolutions involved and the system handling the computation of the amount of gray.

With reference again to FIG. 2, at step S130, the output O(v,w) generated by the scaling step S120, followed by an optional adjustment at step S125, has, in general, a number of levels 'c', larger than the desired number of levels d for printing. If an eight bit gray system is used, for example, 256 levels of gray might be generated, dependent on the actual scaling and rotation, which must be reduced to 2 levels, either black or white in a binary printer or display system. The reduction or quantization to the required number is performed using an error diffusion algorithm.

FIG. 5 illustrates an example of an error diffusion method, adaptive error diffusion. Adaptive error diffusion changes the weights and the destination of the error depending on the input context. Starting at step S400 with O(g,h), each pixel gray level value in O(g,h) is thresholded at step S410. At step S420, error E(g,h) is derived, as the difference between the thresholded value (in a binary system, 0 or 1) and the gray level pixel value O(g,h).

At step S430, if the value of O(g,h) equals one of the legal output values of the printer system, no error E(g,h) is generated and the output $B_o(g,h)$ is set to O(g,h). If the value of O(g,h) is not equal to one of the legal output states of the system, the error E(g,h) is calculated as difference between the value O(g,h) and the legal output state $B_o(g,h)$ used at location (g,h). The error E(g,h) is then distributed to succeeding adjacent pixels in an image content dependent way.

With continued reference to FIG. 5, at step S440, if all the succeeding, adjacent pixels of the pixel in consideration are gray, an error diffusion algorithm with fixed weights is applied at step S450. Subsequently, the next pixel is handled. Alternatively, at step S440, if any of the succeeding adjacent pixels are legal values (0, 1), at step S460, the function is examined to determine if all of the succeeding adjacent pixels are legal values. If all the succeeding adjacent pixels are legal values, an error diffusion algorithm is applied at step S450. If the adjacent succeeding pixels are of mixed gray and legal values, at step S470, the errors from a pixel having a gray level value are passed on to other gray level value pixels, as opposed to legal value pixels. Subsequent to distribution of the error, the next pixel is handled.

This conventional process provides a method for arbitrary resolution conversion with good image output results. However, although this process provides good results for an arbitrary resolution conversion, the method does not remove every artifact in the produced image. More specifically, when utilizing the above-described method, moire can still be present in the image. Thus, the above-described method is not an ideal process for halftone generation due to the presence of moire in the generated image.

SUMMARY OF THE PRESENT INVENTION

Therefore, one object of the present invention is to provide an apparatus which is capable of arbitrary resolution conversion while substantially eliminating moire in the halftone areas.

One aspect of the present invention is a method for converting the resolution of a binary image signal. According to this aspect, the present invention receives a binary image signal having a first resolution and electronically simulates a printing process upon the received binary image signal using a model (function) which closely resembles the actual shape of the print spot produced by the printer. A high resolution gray image signal is generated from the binary image signal and then filtered. The filtered gray image signal is resampled at a certain frequency, thereby producing a gray image signal having a second resolution. This gray image can then be converted to binary by error diffusion.

A second aspect of the present invention is a circuit for converting a resolution of a received binary image signal having a first resolution. The circuit electronically simulates a printing process upon the received binary image signal to produce a high resolution gray image signal using a model (function) which closely resembles the actual shape of the print spot produced by the printer. The high resolution gray image signal is filtered and converted into a binary image signal having a second resolution using an error diffusion process.

A third aspect of the present invention is a system for converting a resolution of a received binary image signal having a first resolution using a Gaussian electronic print simulator to produce a high resolution gray image signal. A first sampler, connected to the Gaussian simulator, then produces a sampled gray image signal which is then filtered by a low pass filter. A second sampler produces a gray image signal having a second resolution from the filtered signal. This gray image can then be converted to binary by error diffusion.

A fourth aspect of the present invention is a system for converting a resolution of a received binary image signal having a first resolution using a flat top Gaussian electronic print simulator to produce a high resolution gray image signal. A first sampler, connected to the flat top Gaussian simulator, produces a sampled gray image signal which is then filtered by a low pass filter. A second sampler produces a gray image signal having a second resolution from the filtered signal. This gray image can then be converted to binary by error diffusion.

BRIEF DESCRIPTION OF THE DRAWINGS

The following is a brief description of each drawing used to describe the present invention, and thus, are being presented for illustrative purposes only and should not be limitative of the scope of the present invention, wherein.

DETAILED DESCRIPTION OF THE PRESENT INVENTION

Figure 1:
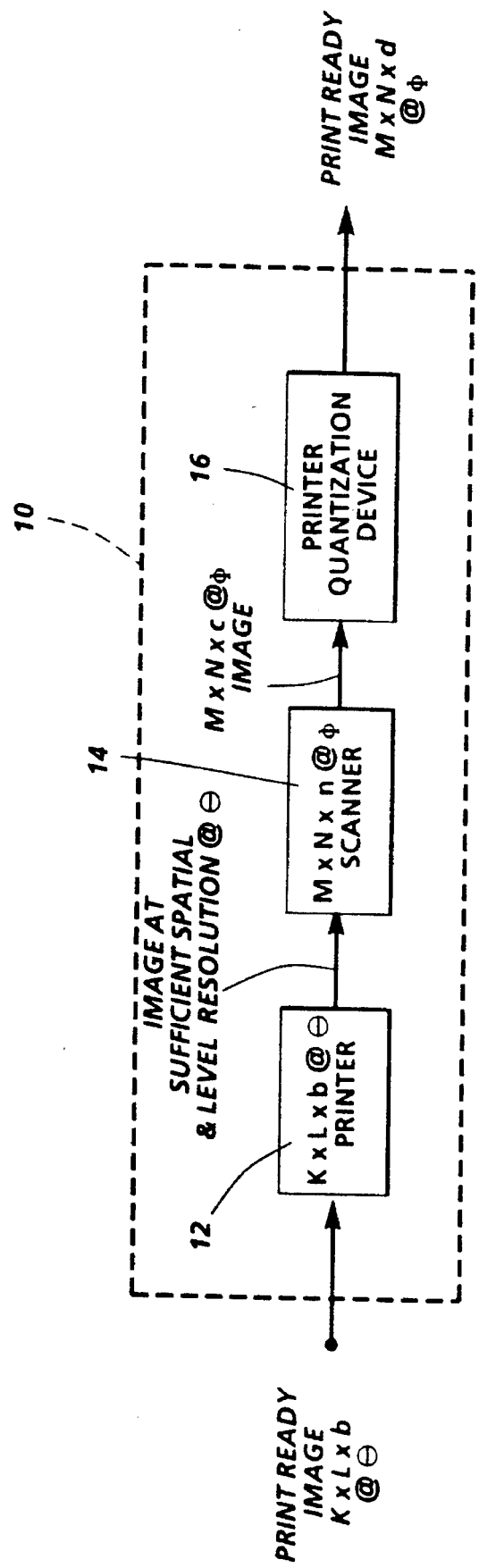
FIG. 1 illustrates a block diagram showing a system of a conventional device used to convert resolution.
Figure 2:
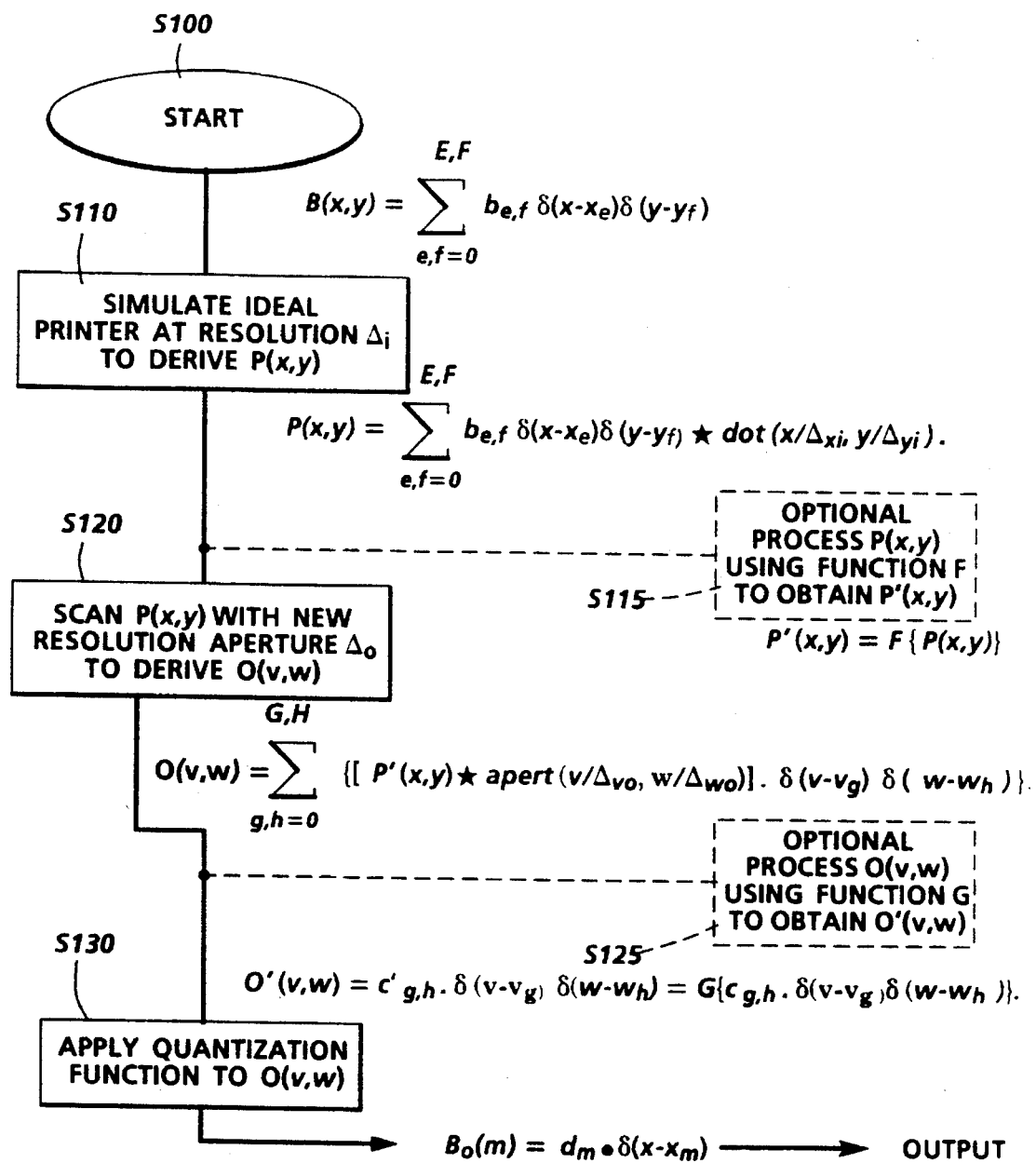
FIG. 2 illustrates a flow chart showing the conversion method utilized in FIG. 1.
Figure 3:
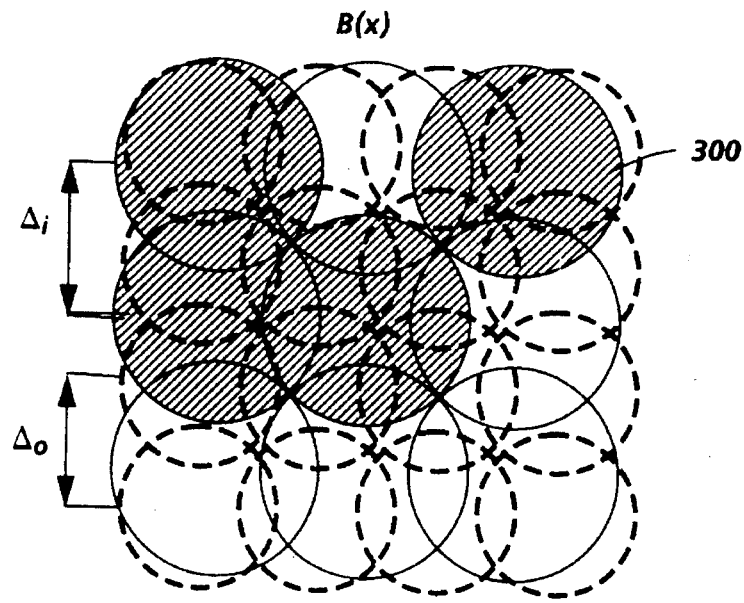
FIG. 3 shows an idealized print scanned at a different resolution.
Figure 4:
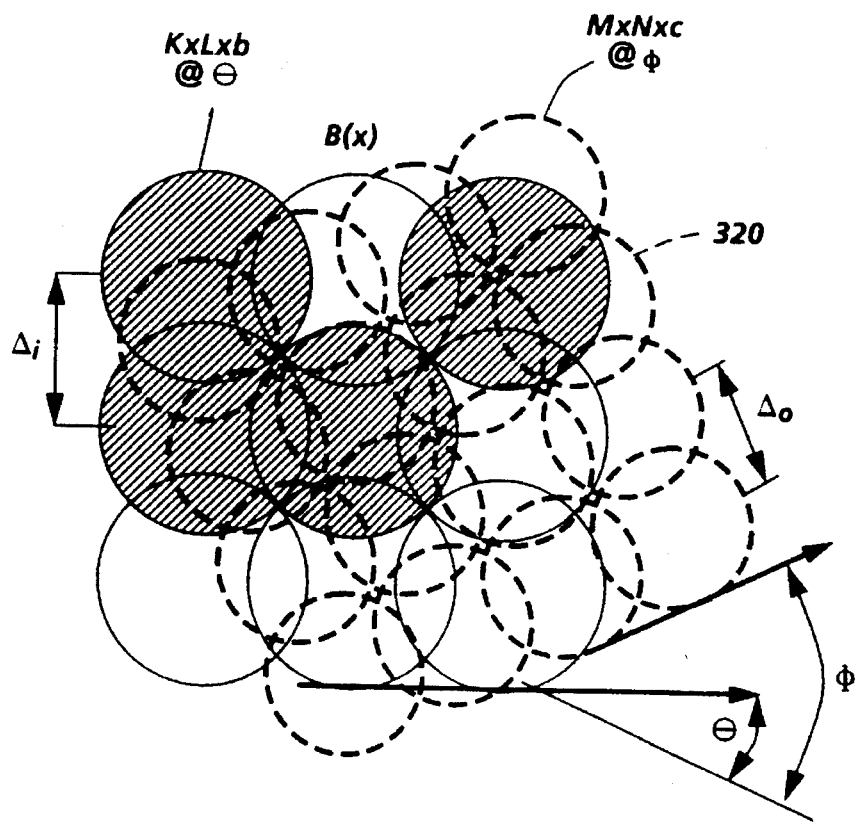
FIG. 4 shows an idealized print scanned at a different resolution and orientation.
Figure 5:
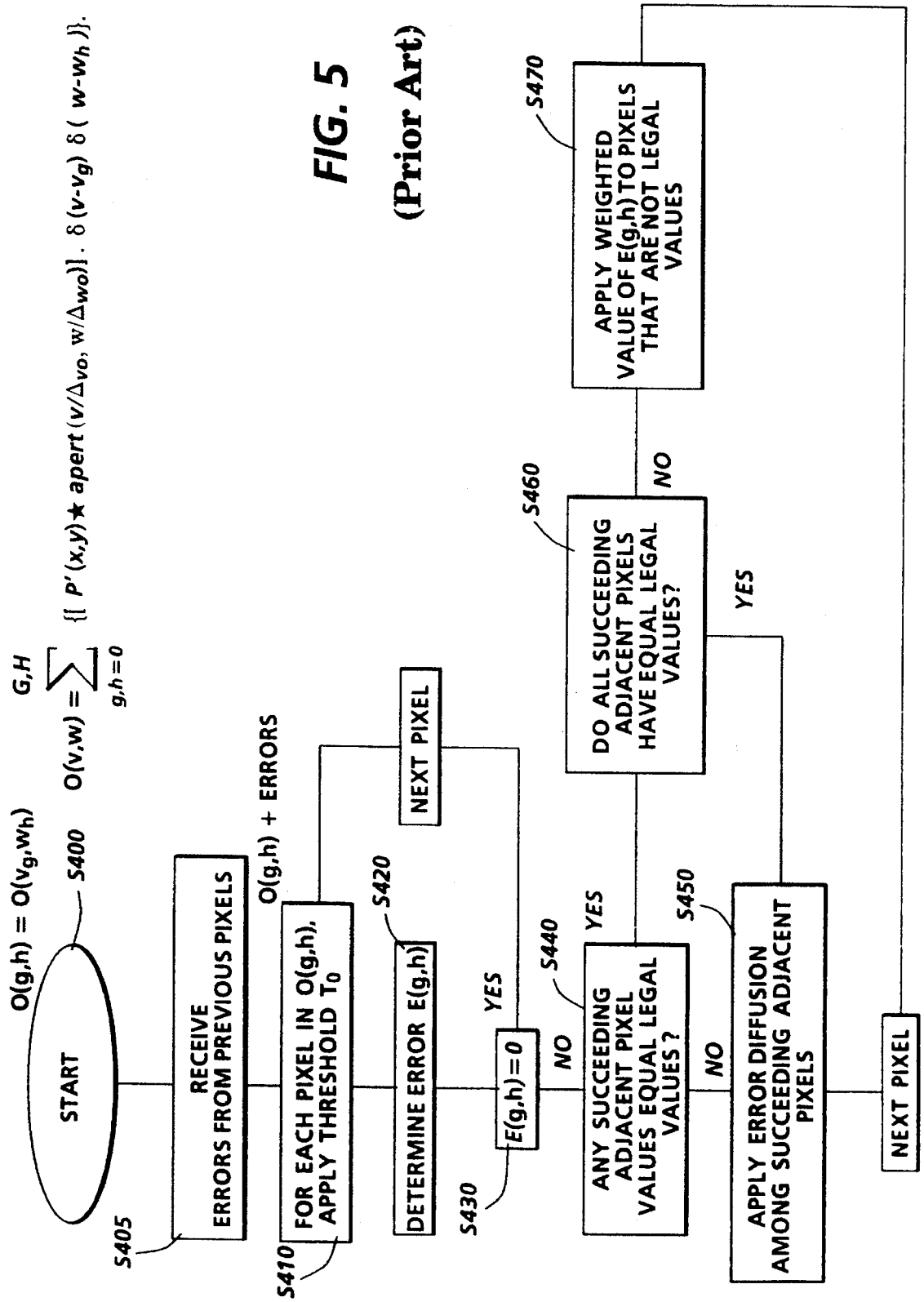
FIG. 5 illustrates a flow chart showing the steps of adaptive error conversion.

The following will be a detailed description of the drawings illustrating the present invention. In this description, as well as in the drawings, like reference numerals represent devices or circuits or equivalent circuits which perform the same or equivalent functions.

Figure 6:
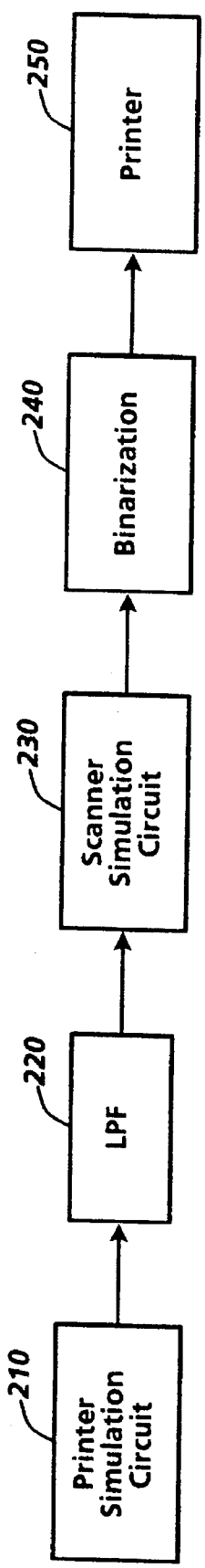
FIG. 6 illustrates a block diagram showing the system emulation of the present invention.

FIG. 6 illustrates the system emulation of the present invention which converts an image having a first resolution to an image having a second resolution. In this emulation, an image to be printed is inputted into a printer simulation circuit 210 which electronically simulates the printing of the image data. This electronic simulation enables a more accurate resolution conversion by converting the resolution from a printed image. In other words, the resolution conversion should take place during the actual scanning of the image, not at the printing routine. This technique is realized using the electronic simulation process wherein the image is reprinted electronically and scanned electronically at a new resolution. Thus, the present invention simulates electronically the printing of the image so that the simulated printed image can be scanned at either a higher or lower resolution.

The printer simulation circuit 210 produces a gray signal which is inputted into a low pass filter 220 to produce a bandlimited gray signal. The band limited gray signal is then fed into a scanner simulation circuit 230 which samples the bandlimited gray signal at the desired resolution to produce a gray image having the second resolution. The gray image having the second resolution is inputted into a binarization circuit 240 to produce a binary image having a second resolution. The binary image is then inputted into a printer 250 which produces a document having the image contained thereon with the second resolution and a same output size as the original image.

Figure 7:
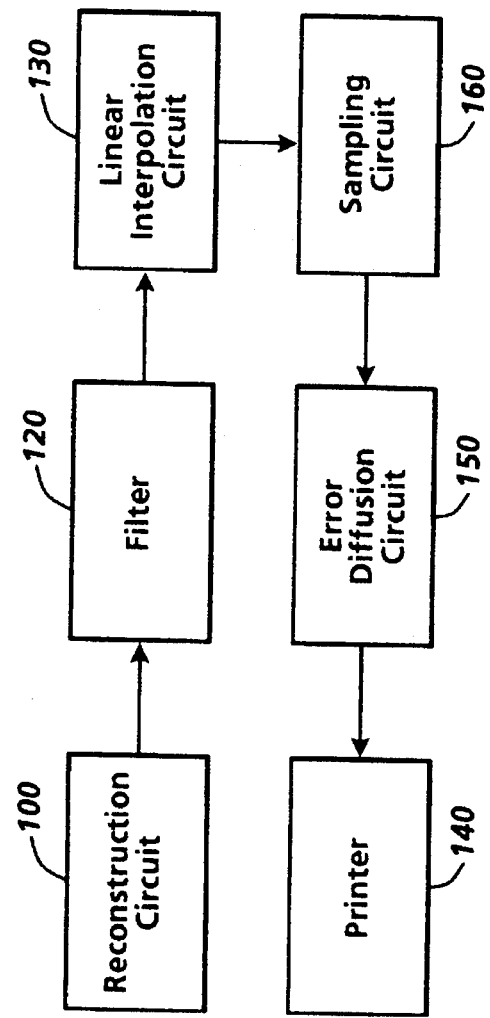
FIG. 7 illustrates a block diagram showing the hardware embodiment of the present invention.

FIG. 7 illustrates a block diagram showing one embodiment of the present invention. This scanning of the simulated printed image is carried out by the reconstruction circuit 100. In this preferred embodiment of the present invention, the reconstruction circuit 100 outputs a digital image at four times the resolution of the inputted image. The oversampled image is then fed into a filter 120, which in the preferred embodiment is a digital low pass filter, that outputs a gray signal which is bandlimited also at a resolution four times the original resolution of the inputted image. The filtered signal is then inputted into a linear interpolation circuit 130 which converts the bandlimited gray image signal into a continuous gray signal. The continuous gray signal is fed into a sampling circuit 160 which samples the continuous gray image at the desired resolution. In the preferred embodiment, the actual implementation of these two steps are combined into a single circuit. This sampled gray image is then inputted into an error diffusion circuit 150 which produces a binary image at the desired resolution. The binary image is fed into a printer 140 for producing an image on the document at a resolution different from the resolution of the original image but which has the same output size as the original image. In the preferred embodiment of the present invention, the systems illustrated in FIGS. 6 and 7 are incorporated into a digital copier system.

The linear interpolation circuit 130, sampling circuit 160, and error diffusion circuit 150 operate substantially the same as the above-identified conventional circuits, and thus, a detailed explanation of the specific functions and operations will be omitted for the sake of brevity.

Figure 8:
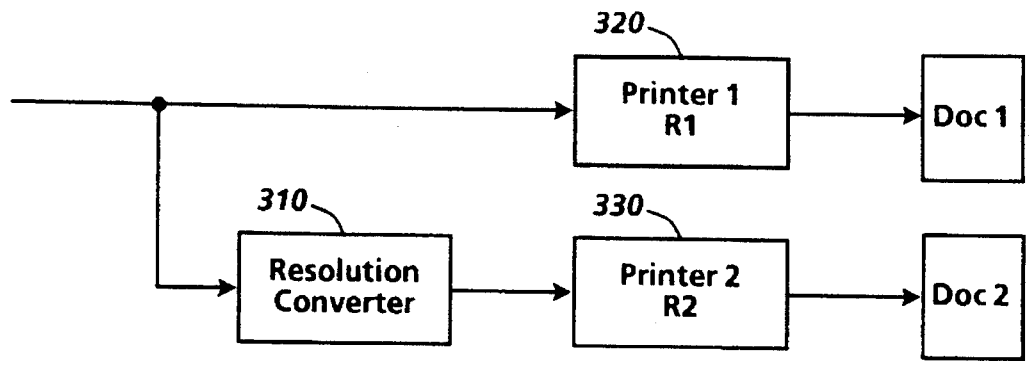
FIG. 8 illustrates a system implementing the concepts of the present invention.

FIG. 8 illustrates an example of the utilization of the concepts of the present invention in a system. More specifically, an image having a first resolution is fed into a printer 320 for printing an image at the first resolution and into a resolution converter circuit 310. The resolution converter circuit 310 may be either the circuit described in FIG. 6 or the circuit described in FIG. 7. The resolution converter circuit 310 converts the image having a first resolution into an image having a second resolution. This image signal having a second resolution is fed into a printer 330 which prints images having the second resolution. Both printer1 320 and printer2 330 print out the inputted images at the specified resolution onto documents. The images formed on each of the documents are of the same size but have different resolutions. The resolution conversion circuit thus enables the printing of the same input bitmap on a printer having any type of resolution.

Figure 11:
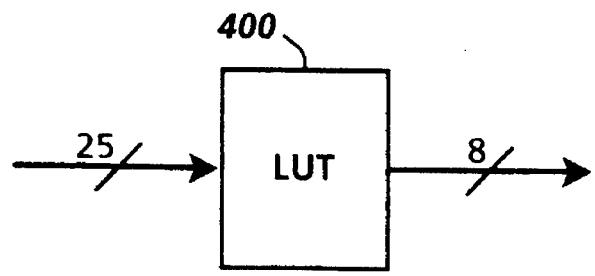
FIG. 11 illustrates one embodiment of the reconstruction circuit of the present invention which produces the simulated printed image.
Figure 12:
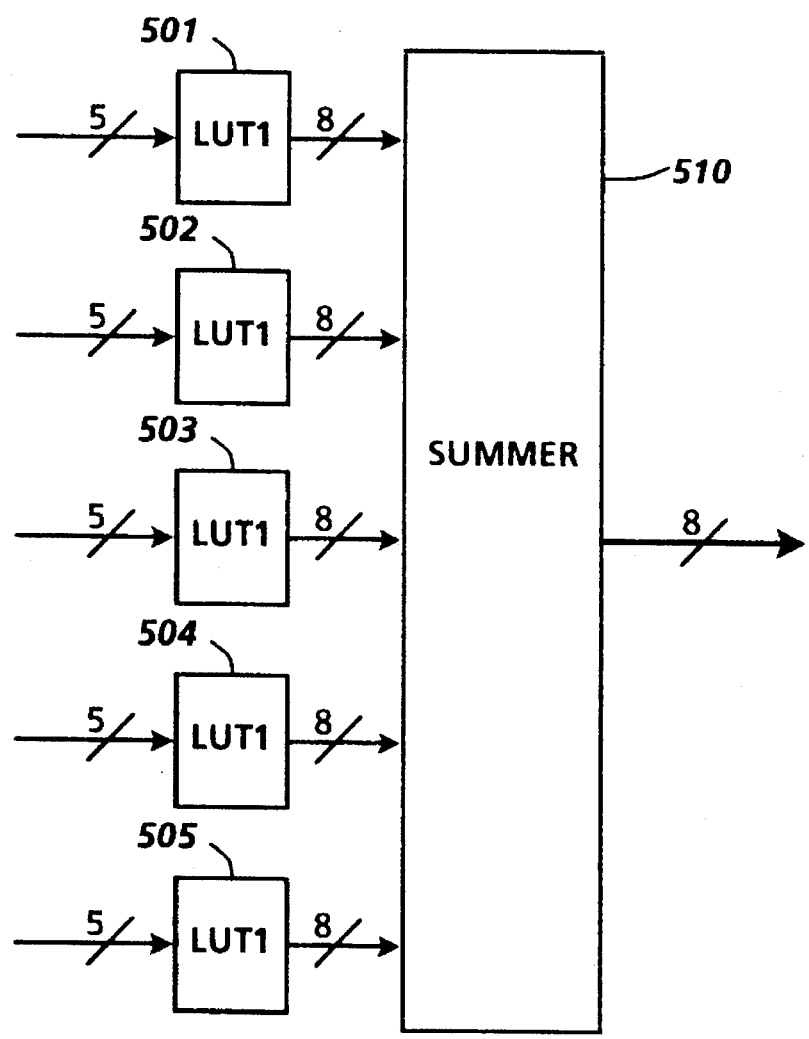
FIG. 12 shows a second embodiment of the reconstruction circuit of the present invention which produces the simulated printed image.
Figure 13:
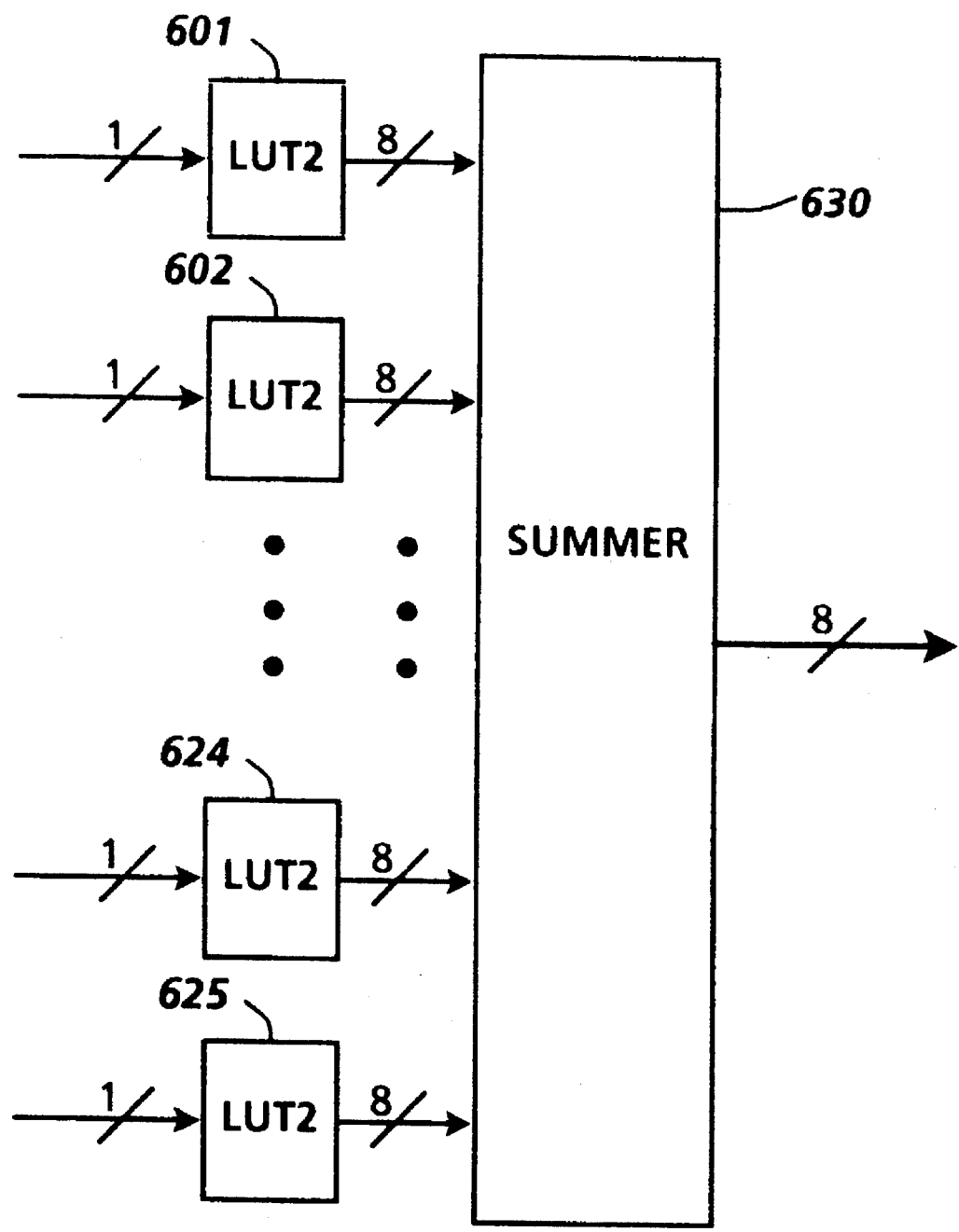
FIG. 13 illustrates a third embodiment of the reconstruction circuit of the present invention which produces the simulated printed image.

With respect to the reconstruction circuit 100, the electronic printing can be carried out using the hardware illustrated in FIGS. 11, 12, and 13. In FIG. 11, a look up table (LUT) 400 receives a single bit binary value from each of the old pixels (P(-2,2) to P(2,-2)) to generate an eight-bit value for one of the sixteen new pixels corresponding to pixel P(0,0) illustrated in FIG. 14. In other words, FIG. 11 only illustrates one of 16 LUTs to generate the values for the new pixels illustrated in FIG. 14.

The LUT 400 has values corresponding to the reconstruction model. In the preferred embodiment, the reconstruction model is the Gaussian function. The reconstruction function could also be one of the other functions illustrated in FIGS. 15 and 19–23.

In FIG. 12, five LUT1s (501–505) receive a single bit binary value from five of the old pixels (P(-2,2) to P(2,-2)) to generate five eight-bit values to be fed into a summer 510. The summer 510 generates the eight-bit value for one of the sixteen new pixels corresponding to pixel P(0,0) illustrated in FIG. 14.

The LUT1s (501–505) have values corresponding to the reconstruction model. In the preferred embodiment, the reconstruction model is the Gaussian function. The reconstruction function could also be one of the other functions illustrated in FIGS. 15 and 19–23.

In FIG. 13, twenty-five LUT2s (601–625) receive a single bit binary value from one of the old pixels (P(-2,2) to P(2,-2)) to generate twenty-five eight-bit values to be fed into a summer 630. The summer 630 generates the eight-bit value for one of the sixteen new pixels corresponding to pixel P(0,0) illustrated in FIG. 14.

The LUT2s (601–625) have values corresponding to the reconstruction model. In the preferred embodiment, the reconstruction model is the Gaussian function. The reconstruction function could also be one of the other functions illustrated in FIGS. 15 and 19–23.

Figure 14:
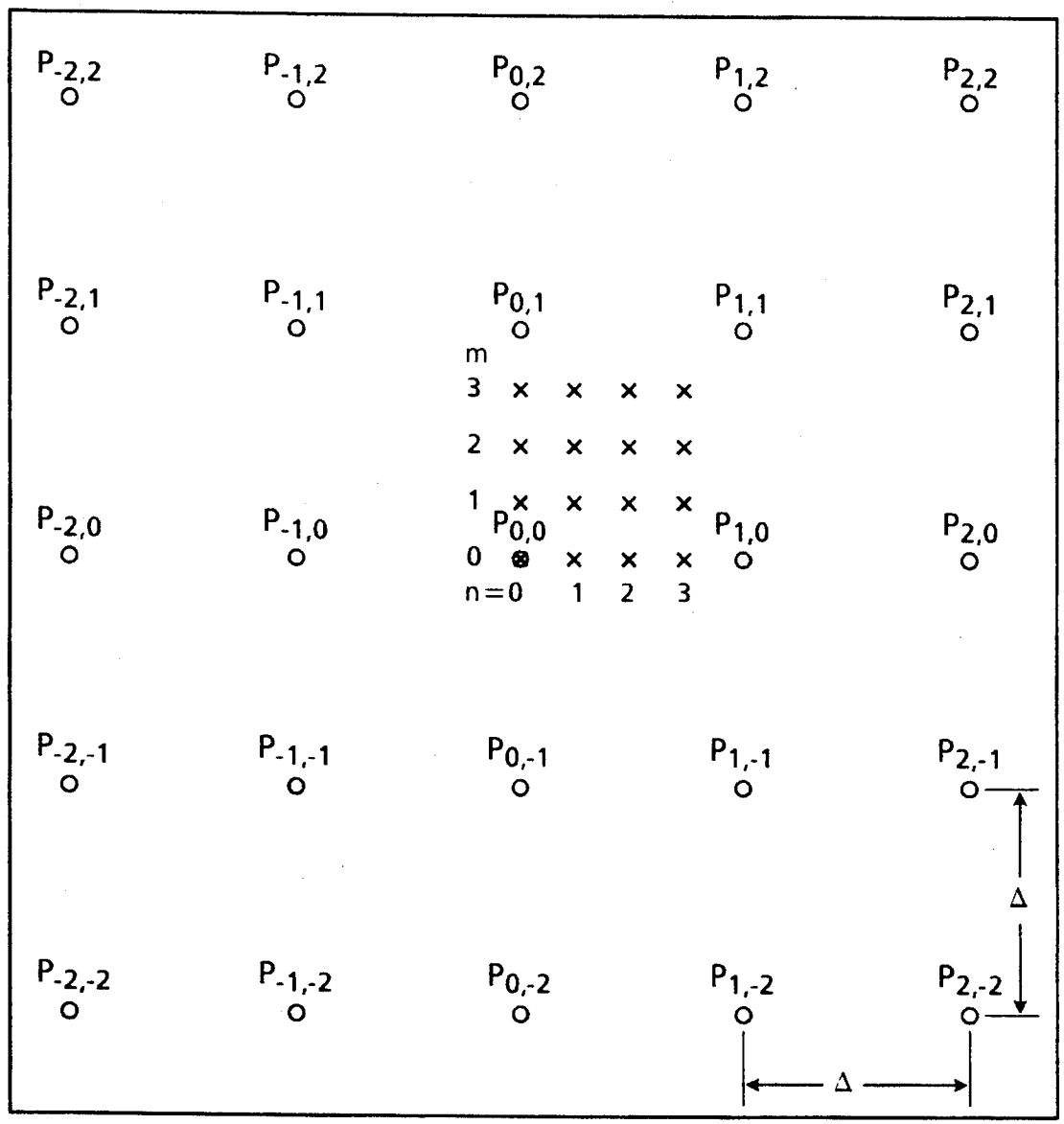
FIG. 14 illustrates a relationship between the arrangement of original binary pixels and the location of the desired gray pixels.
Figure 15:
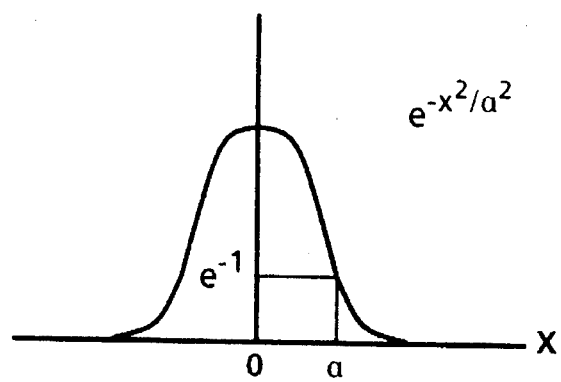
FIG. 15 illustrates a Gaussian spot model in the spatial domain.

FIG. 14 illustrates the pixel relationship between existing (old) pixels and the newly generated (new) pixels with respect to the reconstruction process. The sixteen new pixels (4× resolution) for pixel P(0,0) are generated with respect to the twenty-five surrounding pixels, (P(-2,2) to P(2,-2)), a 5×5 window centered on P(0,0). If the sampling resolution was something other than four times the original resolution, the number of newly generated pixels would change accordingly.

With respect to the look-up tables, the look-up table procedure described in FIG. 12 is the preferred embodiment because it requires a moderate amount of memory and a small number of adders. The entire circuit, including memory, can be implemented on a single ASIC device. The new pixels will be generated one new scan line at a time.

After the new pixels are generated, the video is fed to a device that performs conventional two-dimensional filtering and thereafter to a device that then performs conventional two-dimensional linear interpolation. Finally, the image data is fed to a device that performs conventional error diffusion.

To further explain the present invention, the operations carried out by the present invention will be described below.

As described above, if the bitmap of an image, originally prepared for printing on a printer of resolution R1, is to be printed on a binary printer of a different resolution R2, the original bitmap at R1 needs to be converted to a bitmap at R2 in order to make the size of the images from the two printers match. To enable this conversion and reduce moire in halftones, the present invention performs the following four steps. The present invention converts the bitmap at resolution R1 to a continuous gray image (represented by a high resolution digital image). Next, the present invention filters the high resolution image, and then resamples the gray image at resolution R2. Upon resampling the gray image at resolution R2, the present invention converts the gray image at R2 to a binary image at resolution R2.

Figure 9:
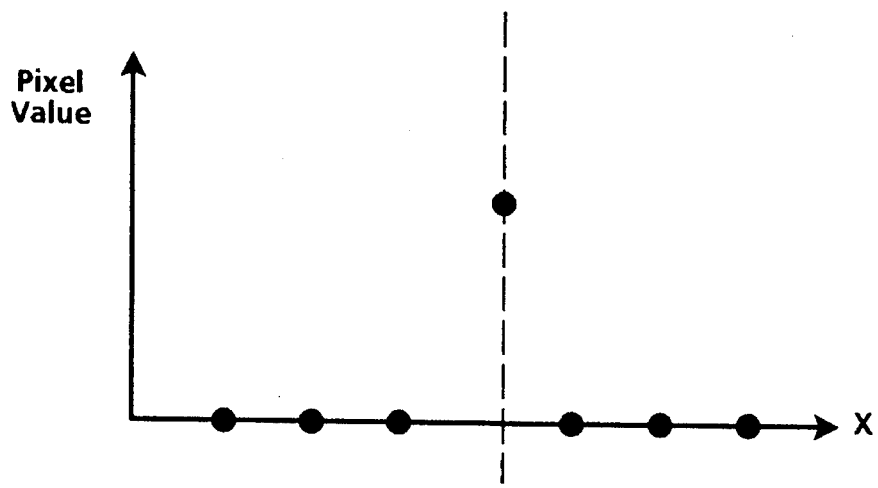
FIG. 9 illustrates a sampled image defined only by its sampling point.
Figure 10:
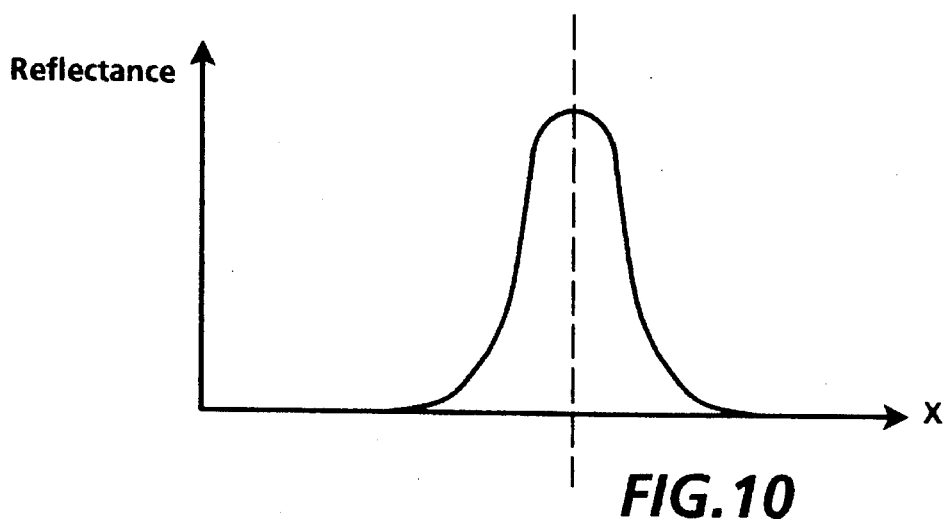
FIG. 10 illustrates a reconstructed image which has a value at every point.

Starting with a bitmap of an image at resolution R1 as illustrated in FIG. 9, it is assumed that this bitmap of the image is sent to its intended printer and a printed image is obtained. This printed image is the ideal result. The printed image is continuous, as illustrated in FIG. 10, in the sense that it has values at every point of the bitmap, while a sampled image has values only at the sampled points. Note that printing is one way of reconstructing the continuous image from the samples. In other words, reconstruction can mean the reverse of sampling. Therefore, converting the bitmap to a continuous gray image can be done by first printing, then measuring the printed image. However, to obtain the continuous image values, it is not necessary to carry out the actual printing and measuring process. The printing process can be modeled with a reconstruction function.

Figure 17:
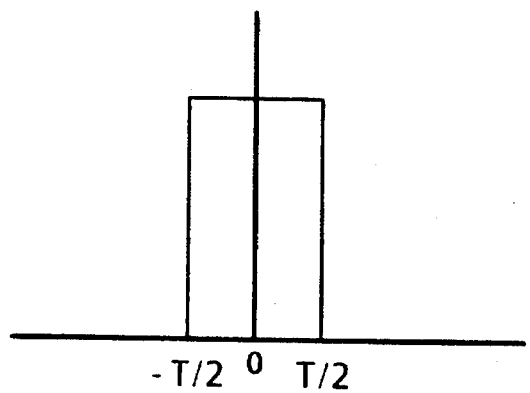
FIG. 17 illustrates a rectangular spot model in the spatial domain.
Figure 18:
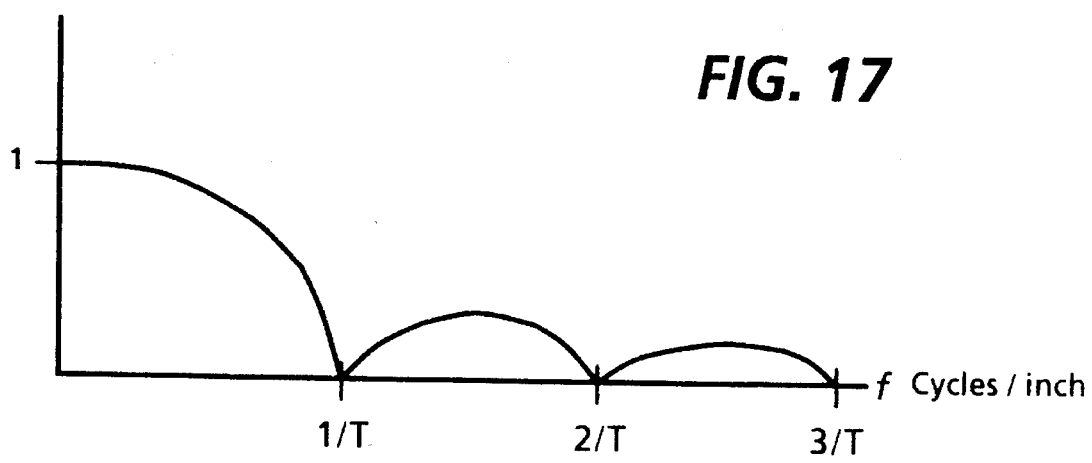
FIG. 18 illustrates a rectangular spot model in the frequency domain.

One conventional way to model the printer is to assume that a printed pixel is a black square with its sides equal to the sampling spacing. For example, a printed 300 spot per inch image will consist of black and white squares 1/300 of an inch on the side. This is equivalent to using a rectangular pulse as a reconstruction function as described in U.S. Pat. No. 5,208,871. Such a function is illustrated by FIGS. 17 and 18 in the present application. As discussed above, unfortunately this simple reconstruction function has the undesirable property of introducing (or not eliminating) sharp edges in the reconstructed image, thereby making the reconstructed image rich in high frequency contents.

Figure 16:
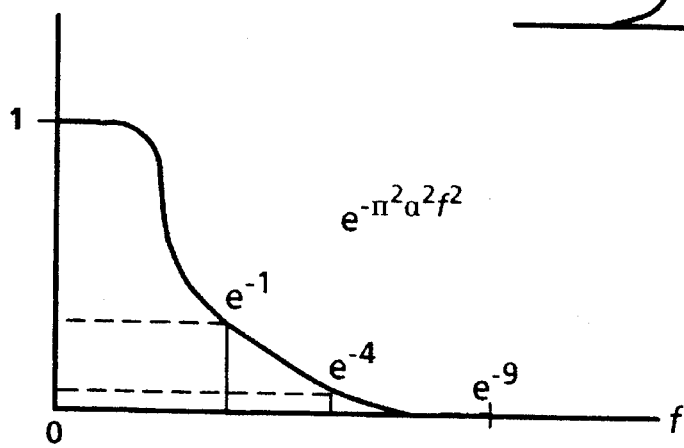
FIG. 16 illustrates a Gaussian spot model in the frequency domain.

To eliminate these problems, the present invention utilizes a model, such as a Gaussian function or other function which is flexible such that the function (model) resembles the shape of the spot to be printed by the printer to electronically simulate the printing of the image. In other words, the model should be dependent on the particular characteristics of the type of printer being used to output the image. In the preferred embodiment, a Gaussian function is used to model a printed spot on paper, thus, the Gaussian function is used as the reconstruction function. As illustrated in FIG. 18, the rectangular pulse reconstruction function frequency response is a sinc function which allows considerable amount of high frequency information to leak through, whereas the frequency response of the Gaussian reconstruction function as illustrated in FIG. 16 is also a Gaussian function.

Figure 19:
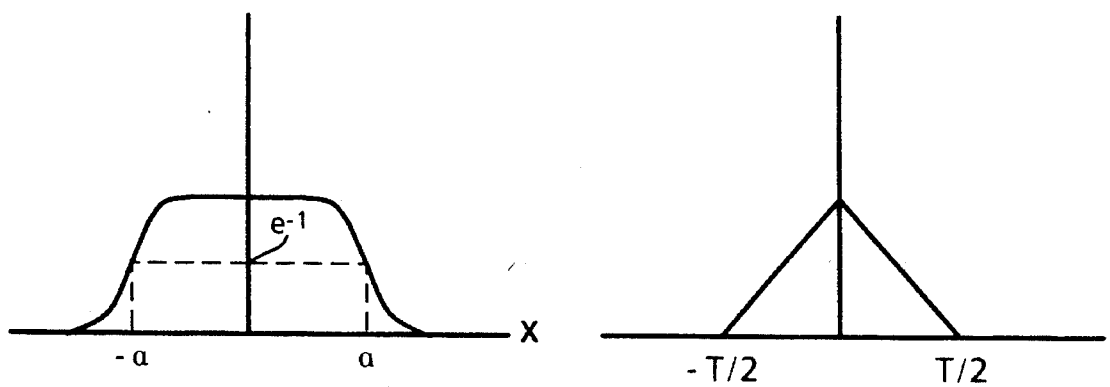
FIG. 19 illustrates a Gaussian spot model with a flat top in the spatial domain.
Figure 20:
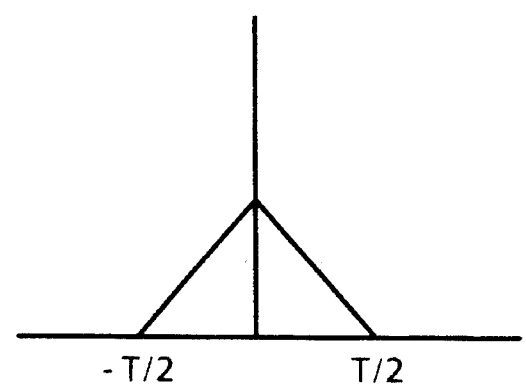
FIG. 20 illustrates a triangular spot model in the spatial domain.
Figure 21:
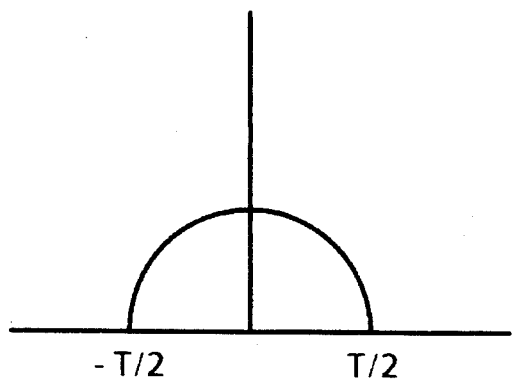
FIG. 21 illustrates a cosine spot model in the spatial domain.
Figure 22:
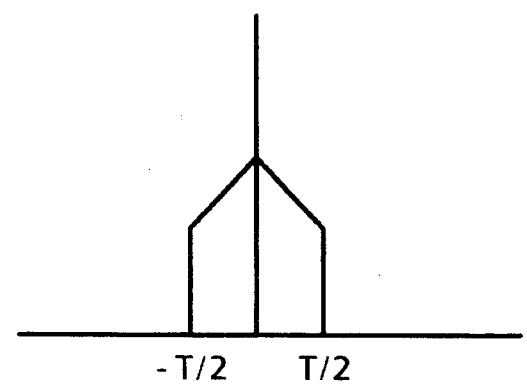
FIG. 22 illustrates a pentagonal spot model in the spatial domain.
Figure 23:
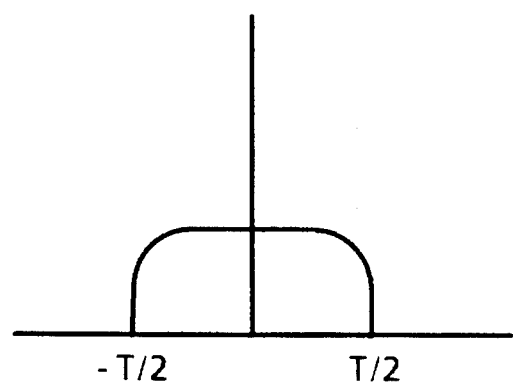
FIG. 23 illustrates a cosine spot model with a flat top in the spatial domain.

Other reconstruction functions that can be used are a flat top Gaussian function as illustrated in FIG. 19; a triangular function as illustrated in FIG. 20; a cosine function as illustrated in FIG. 21; a pentagonal function as illustrated in FIG. 22; or a flat top cosine function as illustrated in FIG. 23. The type of model to be used should be chosen to best emulate the shape of the printed dot, while also ensuring high quality. In the present invention, for a laser printer, a Gaussian model is used because it closely emulates the actual printed dot's shape and realizes high quality. A flat top Gaussian function may be used with an inkjet printer to achieve similar results.

In the present invention, the sampled image is bandlimited such that it does not contain frequency components above the Nyquist frequency, 0.5 R2. To ensure this, the continuous image should be processed by a bandlimiting filter, a low pass filter, with a cutoff frequency at 0.5 R2. To filter the continuous gray image digitally, it is sampled first, at a sufficiently high sampling rate such that no aliasing problem occurs. In the preferred embodiment of the present invention, oversampling is at four times R1, the resolution of the original and the simulated printed image. Starting with this high resolution gray image, a digital filter can filter out frequency components above 0.5 R2, thus ensuring no aliasing when it is sampled at R2. The next step is to sample the filtered image at resolution R2. The sampling points in general will not coincide with the sampling points at 4-R1. To calculate the image values at the new sampling points, linear interpolation can be used.

An important aspect of the filter being used is the frequency response of the bandlimiting filter. A filter with a sharp cutoff at 0.5 R2 will give the maximum image sharpness and no aliasing. However, such a filter can be costly. In practice, a compromise can be made between the amount of aliasing versus the cost of the filter. The requirement of the bandlimiting filter is less stringent when the output resolution is higher than the input resolution. However, when conversion is from high resolution to low resolution, a good bandlimiting filter is required to control aliasing.

Once the continuous gray image is sampled and converted to a gray image at the second resolution, the image must be converted to a binary image at the second resolution for printing on a binary printer. There are many methods to implement this conversion of the scan image to a binary image to achieve satisfactory results. One such method is the use of automatic image segmentation to recognize halftone areas and treat them in a way different from text in line areas which is described in U.S. Pat. No. 4,194,221 to Stoffel. The entire contents of this patent are hereby incorporated by reference. Image segmentation is based on the binary bitmap or the gray image. Halftone areas are low pass filtered to remove the original halftone screen, and a new screen, which is optimized for the printer, is applied. Text/line areas are enhanced with an edge enhancement filter and then thresholded.

Another method is error diffusion. Error diffusion does not depend upon image segmentation because this method can be applied without knowing the image type. Error diffusion observes the local average gray level which is beneficial for fine line reproduction and tone scale preservation. If the original image is of high contrast, such that in the gray image of resolution R2, gray pixels occur only at the edges of black lines or dots, error diffusion is likely to generate dots attached to black pixels which substantially eliminates the dispersed dots and worm shaped artifacts. In contrast, if error diffusion is applied to a general scanned image, the error diffusion method tends to generate isolated dots which are difficult to print and cause worm shaped artifacts to appear in uniform gray areas.

The following is an explanation of how the look-up tables are precalculated and loaded in order to process the images in real time. With respect to this explanation, FIG. 14 will be used. In FIG. 14, the original pixels are identified as P(i,j) wherein i=−2, −1, 0, 1, 2, and j=−2, −1, 0, 1, and 2. Also, with respect to FIG. 14, the new pixels (16 new pixels for each original pixel) are labeled as P(n,m), wherein n=0, 1, 2, 3 and m=0, 1, 2, 3. The following equation governs the conversion of the original pixel to the new pixel:

$$P'(n,m) = \sum_{i,j} g(i,j;n,m) \bullet P(i,j)$$

In this equation, g(i,j; n,m) is the contribution to the new pixel at P'(n,m), from the Gaussian function centered at P(i,j). Pixel P(i,j) is binary, either 1 or 0. When the pixel P(i,j) is 1, there is a contribution to the sum. When the pixel P(i,j) is 0, there is no contribution to the sum. The Gaussian function g(i,j; n,m) depends on the distance from the point P'(n,m) to the point P(i,j), the distance being d(i,j; n,m). In other words, the Gaussian function can be described with the following equation:

$$g(i,j; n,m) = A \bullet exp(-(d(n,m; i,j)^2/\sigma^2))$$

In this equation, $\sigma$ is an adjustable parameter, and A is a normalization constant such that the sum of the contribution from all the 25 points (P(i,j)) to the new pixel at n=o and m=o is equal to 255. The function d(n,m; i,j) is given by the following equation:

$$d(n,m; i,j) = ((m/4-i)^2 + (n/4-j)^2)^{1/2} \bullet \Delta$$

In this equation, $\Delta$ is the spacing between old pixels as illustrated in FIG. 14. If the old pixels are at 300 spots per inch, for example, then $\Delta$=1/300 inch. The Gaussian spot function g (i,j; n,m) can be pre-computed and stored wherein the stored values are used to calculate the new pixel values P'(n,m) as given in the above equation in real time. These values are generated in the reconstruction circuit to simulate electronically the actual printing of the original image. The image values are then processed in conventional manners by the remaining circuits of the arbitrary resolution conversion system.

Although the present invention has been described in detail above, various modifications can be implemented without departing from the spirit. For example, the reconstruction functions, although only described in detail with respect to a few embodiments, may incorporate any function which provides a functional description of the spot being generated by the final printer. In other words the spot model can vary from machine to machine and technology to technology as the shape of the printed spot changes. For example, to emulate the appearance of an ink jet printer, a Gaussian spot model with a flat top can be used.

Moreover, the present invention has been described in utilization with respect to digital copiers. However, the present invention can be utilized in any device which converts digital images of one resolution to digital images of another resolution. More specifically, the arbitrary resolution conversion system as described above could be utilized with respect to a display device.

With respect to the look-up tables, although the look-up table procedure described in FIG. 12 is the preferred embodiment because it requires a moderate amount of memory and a small number of adders; if memory is at a premium, the embodiment illustrated in FIG. 13 can be used which requires only 400 bytes but will need a total of 24 adders. The addition operations or adders can be pipelined to maintain throughput.

Look-up tables can be loaded with functional values other than Gaussian. For example, to emulate the appearance of an ink jet printer, a Gaussian or cosine spot model with a flat top can be loaded. Thus, by loading different forms in the look-up table, one can tune the appearance of the resolution converted image to the type of printer being used to print the final image onto a document. It may also be possible to include the effect of bandlimiting filter in the same look-up table. This will increase the size of the look-up table but will eliminate the two-dimensional filter, thereby saving on costs.

While the invention has been described with reference to the various embodiments disclosed above, it is not confined to the details set forth above, but is intended to cover such modifications or changes as may come within the scope of the attached claims.

What is claimed is:

1. A method for converting a binary image signal having a first resolution to a gray image signal having a desired resolution, comprising the steps of:

(a) receiving the binary image signal having the first resolution;

(b) electronically simulating, using the received binary image signal, a printing process using a function resembling a Gaussian function to generate a first continuous gray image signal from the received binary image signal;

(c) sampling the first continuous gray image signal at a second resolution to produce a sampled gray image signal, the second resolution being higher than the first resolution;

(d) filtering the sampled gray image signal to produce a bandlimited gray image signal;

(e) linearly interpolating the bandlimited gray image signal to produce a second continuous gray image signal; and (f) sampling the second continuous gray image signal at a certain frequency, thereby producing a gray image signal having the desired resolution.

2. The method as claimed in claim 1, wherein the second resolution image signal is four times greater than the first resolution.

3. The method as claimed in claim 1, further comprising the steps of:

(g) error diffusing the gray image signal having the desired resolution; and (h) printing the gray image signal produced by said step (g) onto a document.

4. A method for converting a binary image signal having a first resolution to a gray image signal having a desired resolution, comprising the steps of:

(a) receiving the binary image signal having the first resolution;

(b) electronically simulating, using the received binary image signal, a printing process using a function resembling a Gaussian function that has been modified with a flat top to generate a first continuous gray image signal from the received binary image signal;

(c) sampling the first continuous gray image signal at a second resolution to produce a sampled gray image signal, the second resolution being higher than the first resolution;

(d) filtering the sampled gray image signal to produce a bandlimited gray image signal;

(e) linearly interpolating the bandlimited gray image signal to produce a second continuous gray image signal; and (f) sampling the second continuous gray image signal at a certain frequency, thereby producing a gray image signal having the desired resolution.

5. The method as claimed in claim 4, wherein the second resolution is four times greater than the first resolution.

6. A system for converting a binary image signal having a first resolution to a gray image signal having a desired resolution, comprising:

reconstructing means for electronically simulating, using the binary image signal, a printing process using a function resembling a Gaussian function to generate a first continuous gray image signal from the binary image signal;

first sampling means for sampling the first continuous gray image signal at a second resolution to produce a sampled gray image signal, the second resolution being higher than the first resolution;

filter means for filtering said sampled gray image signal to generate a bandlimited gray image signal;

means for linearly interpolating the bandlimited gray image signal to produce a second continuous gray image signal; and second sampling means for sampling the second continuous gray image signal at a certain frequency, thereby producing a gray image signal having the desired resolution.

7. The system as claimed in claim 6, wherein the second resolution is four times greater than the first resolution.

8. The system as claimed in claim 6, further comprising:

error diffusion means for error diffusing the gray image signal having the desired resolution.

9. The system as claimed in claim 8, further comprising:

means for printing the image signal from said error diffusion means onto a document.

10. The system as claimed in claim 6, wherein said reconstructing means comprises:

a plurality of look-up tables, each generating an eight-bit value, prestored therein, representing a new pixel according a predetermined number of inputted pixel values corresponding to the received binary image.

11. The system as claimed in claim 6, wherein said reconstructing means comprises:

a plurality of look-up tables, each generating an eight-bit value, prestored therein, according to a predetermined number of received pixel values corresponding to the received binary image; and a summer, operatively connected to each look-up table to generate an eight-bit value representing a new pixel.

12. The system as claimed in claim 6, wherein said reconstructing means comprises:

a plurality of look-up tables, each generating an eight-bit value, prestored therein, according to a single received pixel value corresponding to the received binary image; and a summer, operatively connected to each look-up table to generate an eight-bit value representing a new pixel.

13. A system for converting a binary image signal having a first resolution to a gray image signal having a desired resolution, comprising:

reconstructing means for electronically simulating, using the binary image signal, a printing process using a function resembling a Gaussian function which has been modified to have a flat top to generate a first continuous gray image signal from the received binary image signal;

first sampling means for sampling the first continuous gray image signal at a second resolution to produce a sampled gray image signal, the second resolution being higher than the first resolution;

filter means for filtering said sampled gray image signal to generate a bandlimited gray image signal;

means for linearly interpolating the bandlimited gray image signal to produce a second continuous gray image signal; and second sampling means for sampling the second continuous gray image signal at a certain frequency, thereby producing a gray image signal having the desired resolution.

14. The system as claimed in claim 13, wherein the second resolution is four times greater than the first resolution.

* * * * *